No. 849,824. PATENTED APR. 9, 1907.
J. O. WINSTON.
APPARATUS FOR MAKING MOLDED BLOCKS.
APPLICATION FILED FEB. 5, 1907.
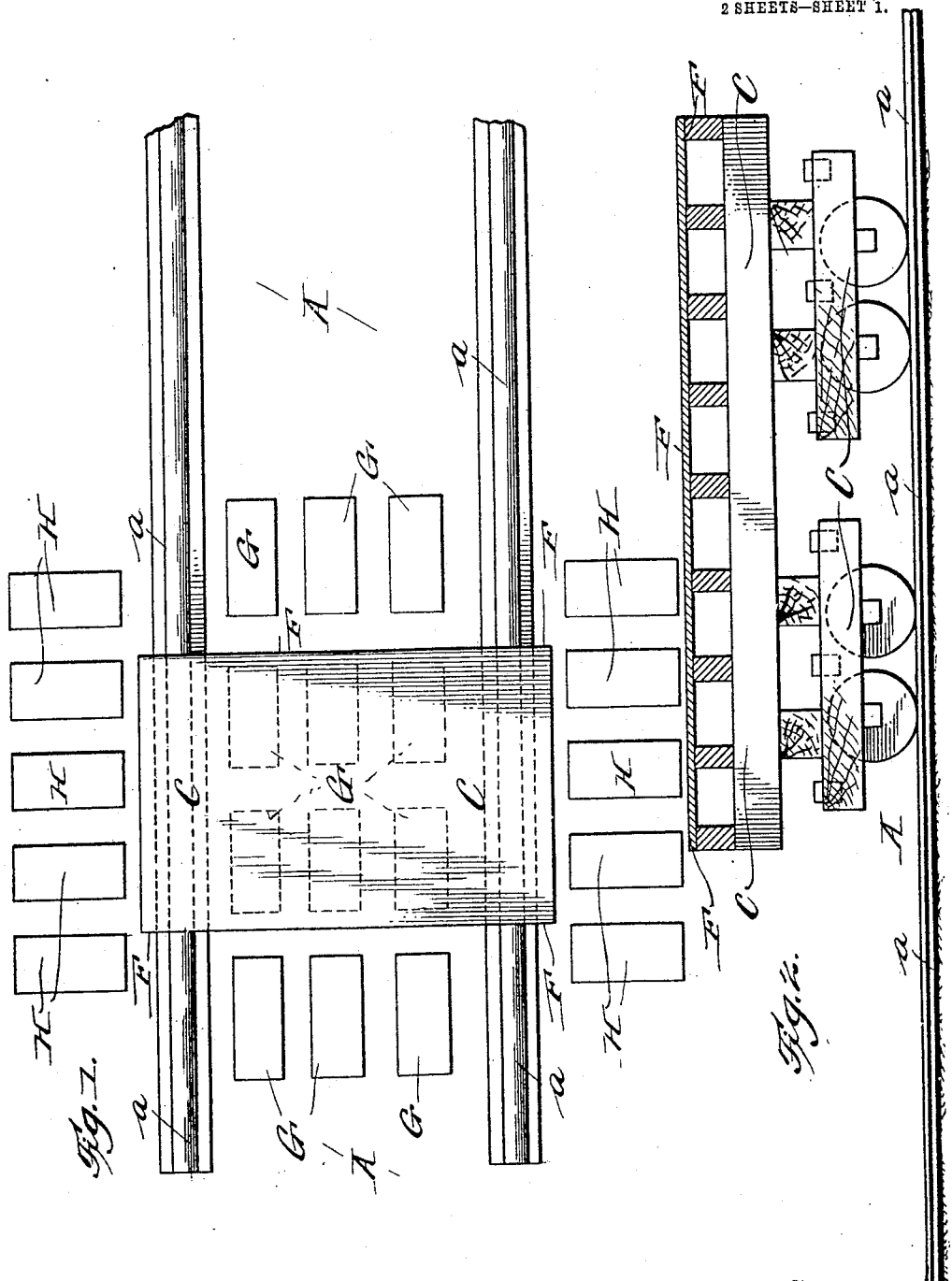

No. 849,824. PATENTED APR. 9, 1907.
J. O. WINSTON.
APPARATUS FOR MAKING MOLDED BLOCKS.
APPLICATION FILED FEB. 5, 1907.
2 SHEETS—SHEET 2.
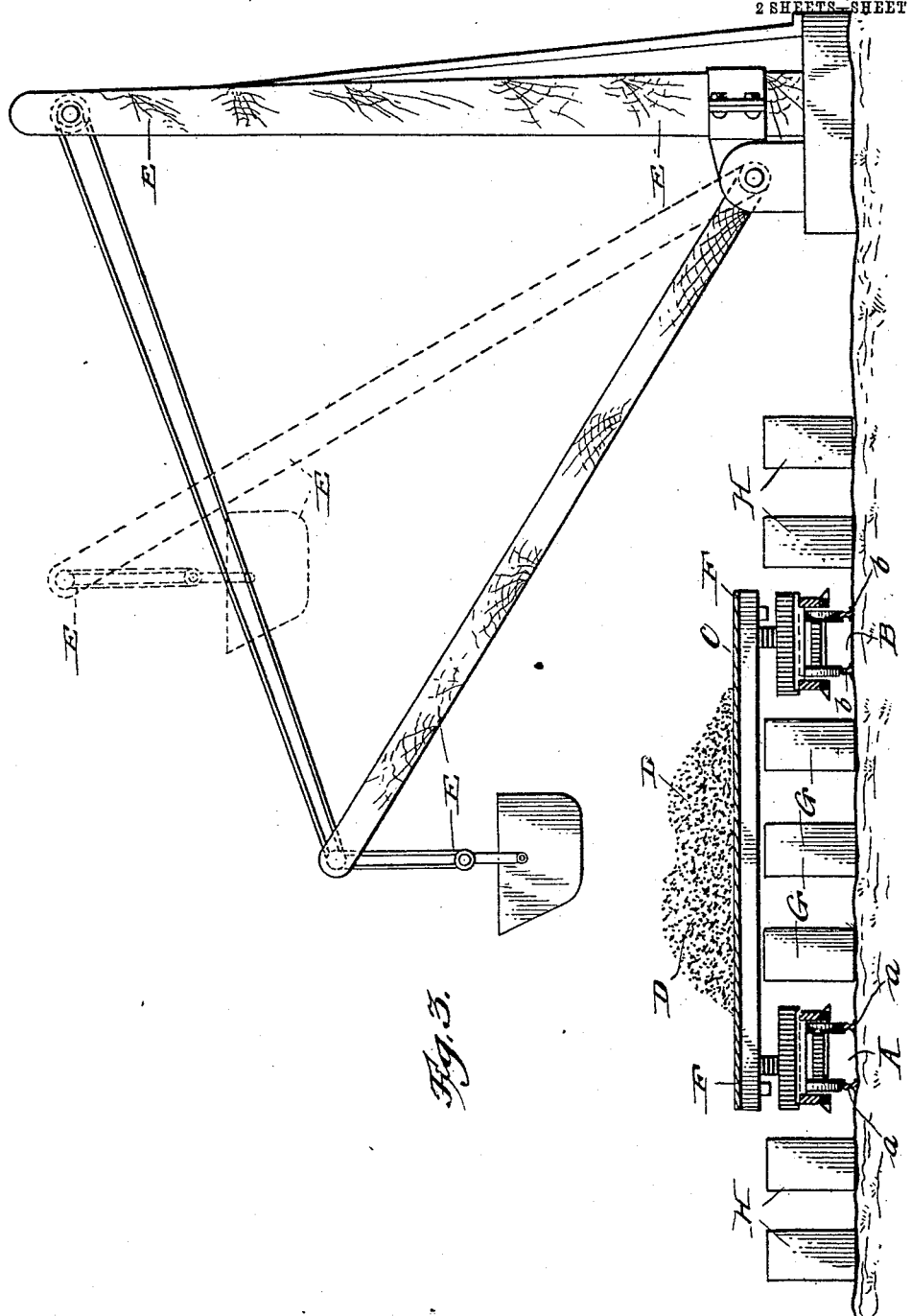

UNITED STATES PATENT OFFICE.

JAMES O. WINSTON, OF RICHMOND, VIRGINIA.

APPARATUS FOR MAKING MOLDED BLOCKS.

No. 849,824.    Specification of Letters Patent.    Patented April 9, 1907.

Application filed February 5, 1907. Serial No. 355,837.

*To all whom it may concern:*

Be it known that I, JAMES O. WINSTON, a citizen of the United States, and a resident of Richmond, in the county of Henrico and State of Virginia, have invented certain new and useful Improvements in Apparatus for Making Molded Blocks, of which the following is a specification.

This invention pertains to a novel and useful apparatus for manufacturing molded blocks, such as concrete blocks, artificial stone, and the like.

In the construction of many modern buildings, bridges, viaducts, dams, and the like it has become the practice to employ blocks of concrete or artificial stone. Owing to the bulky nature of the material it is usual to mold or form the blocks in the locality where the work is in progress, the ingredients being suitably mixed and the composition prepared in bulk and then distributed to the various molds. It has been the experience of those skilled in the art that the work of making these blocks is slow, tedious, and expensive. For instance, in constructing a dam many thousands of comparatively large blocks may perhaps be required and each block may be of such large size as to require the use of machinery, such as derricks and the like, in handling the same after it has been made.

In the present instance I have devised an apparatus for forming these blocks which experience has proven to be far superior to the means now ordinarily employed for making the blocks.

By my invention blocks may be made more speedily, economically, cheaply, and with the expenditure of less time and labor than heretofore has been possible, while when the blocks are finished they are in a convenient position to be carried to the work in progress.

My invention consists in the improved apparatus for making blocks of concrete, artificial stone, and similar substances, set forth in and falling within the scope of the appended claims.

In order that my invention may be more fully understood, I have shown in the accompanying drawings one arrangement by which it may be carried into effect, although I wish it to be understood that I do not limit myself to the precise construction which, for the purpose of illustration, I have herein delineated.

Figure 1 is a plan view of an apparatus for use in carrying out my invention. Fig. 2 is a side view, in vertical section, of a truck or car adapted to receive the material in bulk or mass. Fig. 3 is a view illustrating the position of the moving platform or truck relative to the mold and showing a loading apparatus operating in conjunction with the truck.

In the apparatus shown in the drawings, A and B indicate trackways, each trackway having the two rails $a\ a$ and $b\ b$. C indicates a traveling platform or truck moving along said rails, upon which platform is adapted to be placed the mass of material indicated at D.

E designates a loading device, such as a derrick, for depositing the concrete or other material upon the flat surface F of the top of the truck, this surface being preferably formed by placing a sheet of metal or the like on the top surface of a car, so that in shoveling or removing the material from the platform the work may be expedited.

The tracks A B are preferably spaced apart a suitable distance to permit the concrete molds G to be placed therebetween, the truck-platform being of such a height above the ground-line as to pass over the tops of the molds G. Outside of and on either side of the track I arrange rows of molds H. It will thus be seen that extending lengthwise of the trackway and between such tracks are rows of molds G, while rows of similar molds H extend lengthwise the track outside the rail. The molds outside of the rails are preferably placed endwise relatively to the track, while those between the rails are preferably placed sidewise.

In carrying out the invention the mass of material is dumped upon the platform, and the operators standing thereon may shovel or otherwise deposit and distribute the material into the molds between the tracks and those alongside the track, the truck in its progress being moved along, thus enabling the line of molds, which may extend any suitable distance—for instance, two hundred yards—to be filled successively. When the material in the mold has settled and hardened, so that a complete block is formed, the molds may then be knocked down or moved and the block or blocks conveyed to the place of use by any suitable means.

What I claim is—

1. An apparatus for manufacturing molded blocks, comprising a platform movable along a trackway, a plurality of molds arranged between the rails of the trackway, and a plurality of molds arranged alongside and outside of the trackway, the construction being such that the material may be distributed from the platform to the molds between the rails and to the molds outside the trackway.

2. An apparatus for manufacturing molded blocks, comprising a trackway, a plurality of molds arranged in the space between the rails of the trackway, a plurality of molds arranged alongside and outside of the trackway, a platform movable along the trackway and upon which the material is deposited in bulk and from which said material is distributed to the molds between the rails and to the molds outside the trackway as the platform is moved from place to place on the trackway, such platform being of sufficient height to pass over the molds between the rails.

In testimony whereof I have hereunto signed my name to this specification in the presence of two subscribing witnesses.

JAMES O. WINSTON.

Witnesses:
R. B. CAVANAGH,
JOS. J. PIERANDO.